Figure 1:
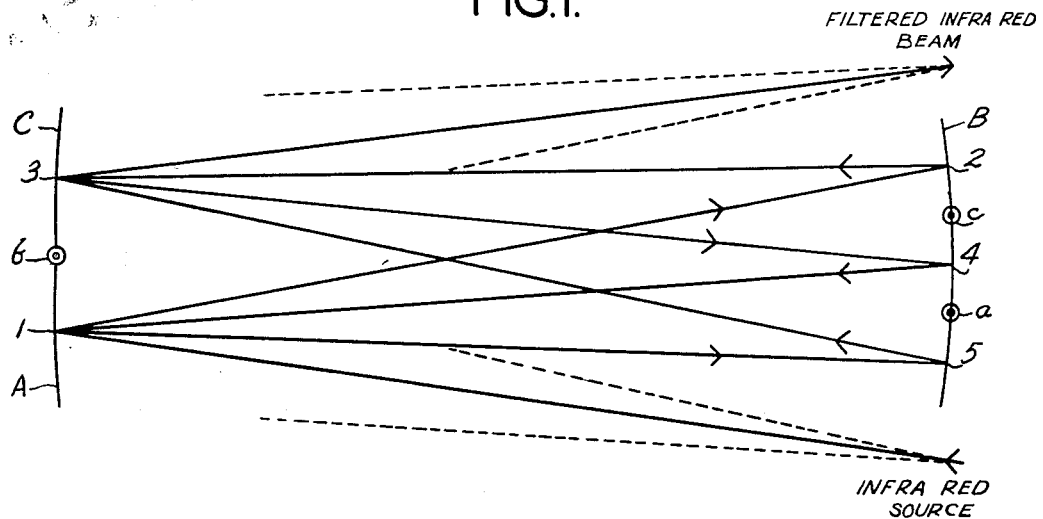

Jan. 3, 1956    J. U. WHITE    2,729,143
INFRARED OPTICAL SYSTEM
Filed June 13, 1950    2 Sheets-Sheet 1

INVENTOR
JOHN U. WHITE
BY
his ATTORNEYS

United States Patent Office 2,729,143
Patented Jan. 3, 1956

2,729,143

INFRARED OPTICAL SYSTEM

John U. White, Darien, Conn.

Application June 13, 1950, Serial No. 167,792

2 Claims. (Cl. 88—105)

This invention relates to apparatus for characterizing and analyzing materials by measuring their absorption of infra-red radiation of selected wave length, and more particularly to a system of selective reflection filters for separation of radiation of selected wave length from that of adjacent wave lengths in the light obtainable from a source of infra-red radiation.

Most substances have the property of absorbing infra-red radiation at particular wave lengths that are characteristic of the individual substances. The exact distribution and intensity of these characteristic absorption bands, called the absorption spectrum, is a unique property of every substance, being different for every chemical compound. The absorption bands of one compound are never exactly duplicated in another. In most simple mixtures of compounds some of the absorption bands of each compound occur at wave lengths that are relatively free of absorption by the others.

The amount of energy removed from a beam of radiation on passing through an absorbing material is a function of the amount of energy falling on the material, $I_0$; the wave length of the radiation; the absorption coefficient of the material at this wave length, $k$; the concentration of the material, $c$; and the thickness of the material traversed, $l$. The exact relationship between these quantities has been stated by Beer to be $$\log I_0/I = kcl$$

where $I$ is the energy transmitted through the material, and the energy removed is $I_0 - I$.

Beer's law of absorption ordinarily holds independently for each chemical compound present in a mixture, the properties of the individual compounds being retained on admixture. It is therefore possible to determine how much of each compound is present from measurements of the amounts of absorption at wave lengths where each has a characteristic absorption band and none of the other compounds have absorption.

This principle is utilized to analyze quantitatively a wide range of substances. The essential parts of an instrument for this purpose are:

(1) A source of infra-red radiation.

(2) A means for separating the effects of a band of radiation of characteristic wave lengths absorbed by the substance to be studied.

(3) Equipment for handling the samples forming or containing the substance to be studied.

(4) A detector system comprising a detector, an amplifier and a meter or recorder for detecting and converting for observation the amount of energy transmitted by the sample.

Where filters, rather than dispersing elements, are used to separate the effects of radiation of specific wave lengths, the instrument is often called an infra-red analyzer or gas analyzer. In the infra-red analyzer there are several different possible forms for the essential elements above.

The detector system may be either selective, i. e., capable only of detecting radiation of certain infra-red wave lengths, such as Lehrer's differential manometer, or nonselective, i. e., capable of detecting radiation of any of a wide range of infra-red wave lengths. The latter type of system is less expensive and is therefore customarily employed.

If a nonselective detector system is used, the selectivity or degree to which the instrument may be made to respond only to absorption by one component depends on the purity of the radiation striking the detector and the extent to which the effects of radiation of unwanted wave lengths can be compensated for. Thus, if radiant energy is absorbed in the sample by other than the desired material and not compensated for, it produces a spurious signal that is misinterpreted as absorption due to the substance being studied. It is therefore important to eliminate at some point in the system the effects of all radiation of a wave length which might be absorbed by substances other than the substance being studied. For this purpose it is desirable to employ one or more selective filters.

The principal filters that are currently available for use in infra-red analyzers are transmission filters of selectively absorbing materials, such as glass, mica, organic liquids and gases, scattering and Christiansen filters, etc., and selective reflection filters. None of these filters, however, is completely selective; that is, no one filter completely absorbs the light of undesired wave lengths. If separation of the undesired wave lengths is to be essentially complete, the light beam must be passed through or reflected from a number of filters arranged in sequence. Transmission filters have been used to isolate radiation in broad wave length intervals, but it is not possible to find combinations of such filters that isolate more than a relatively few wave lengths. They are only effective in special cases. Certain selective reflection filters are also severely limited as to the number of wave lengths that may be isolated. They have the additional drawback of only reducing the intensity of the unwanted radiation rather than removing it fairly completely.

Selective reflection filters of the interference type can be made selective for radiation of any desired wave length, but they also select radiation of a group of other wave lengths and are not completely absorbing at any wave length. To achieve essentially complete removal of these wave lengths, the radiation must be reflected from a number of filters. Since the interference filters are expensive, and cannot be cleaned or handled without damaging them, use of a multiplicity of filters becomes quite expensive. It is obviously desirable to keep the number of filters required to the minimum.

In accordance with this invention a system of selective reflection filters is provided which substantially completely separates radiation of undesired adjacent wave lengths from infra-red radiation obtained from conventional sources without severely diminishing the intensity of the reflected light of the desired wave length. The system may be used in combination with a source of infra-red radiation, a sample holder, a detector of infra-red radiation, and an amplifier for amplifying and transmitting the detector signal to a meter or a recorder for study by an observer. Such an apparatus is a useful analyzer for the quantitative analysis of substances displaying characteristic absorption bands in the infra-red region.

Figure 2:
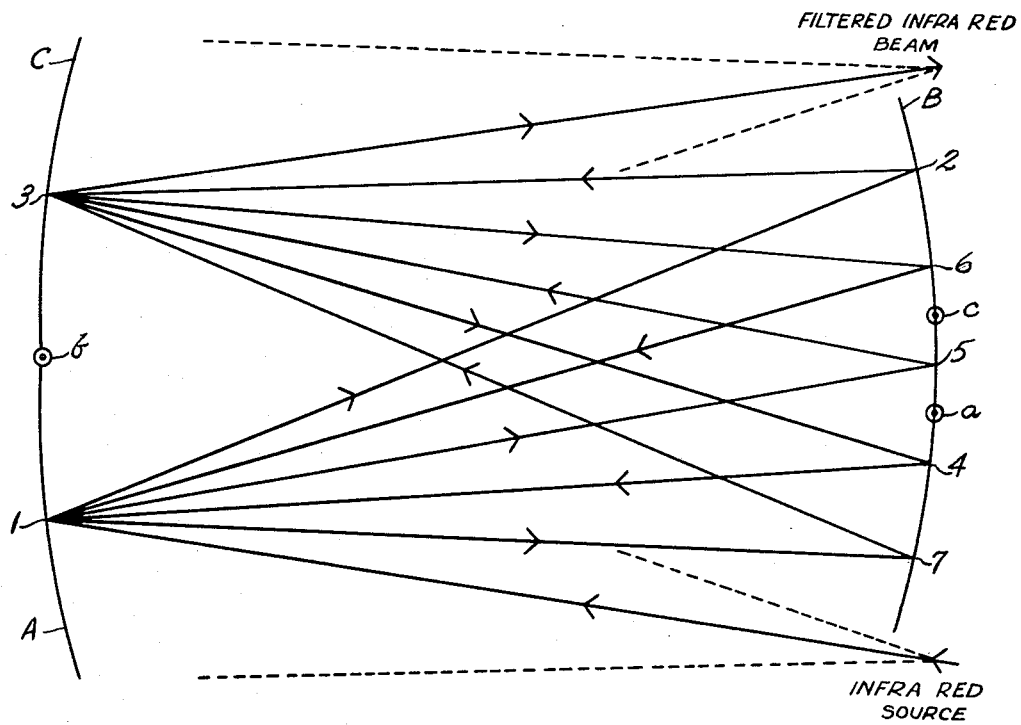

The invention will be explained in connection with the accompanying drawings which are merely illustrative and in which:

Figs. 1 and 2 schematically show a system of three selective reflection filters arranged in accordance with the invention.

Figure 4:
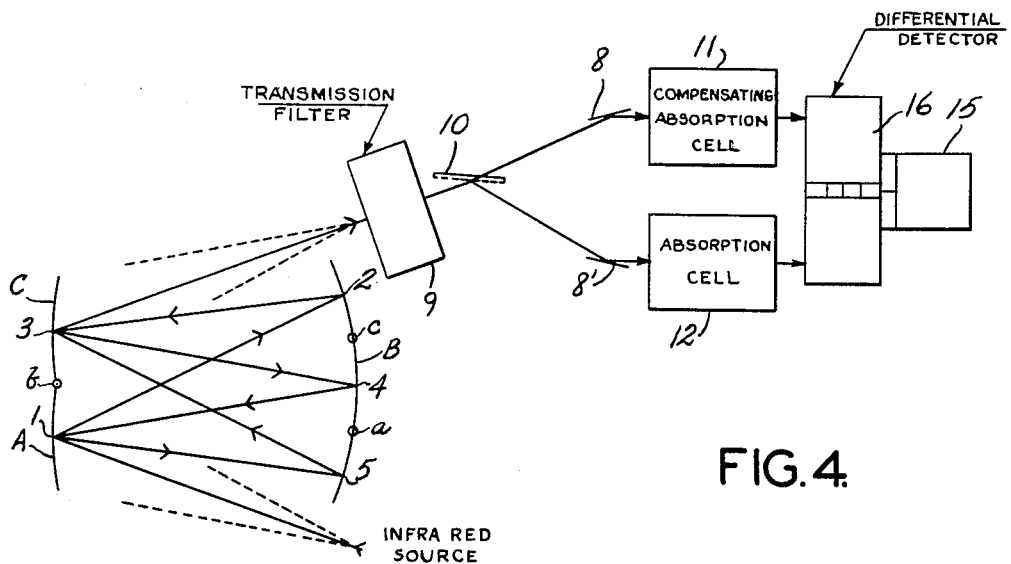
Figure 3:
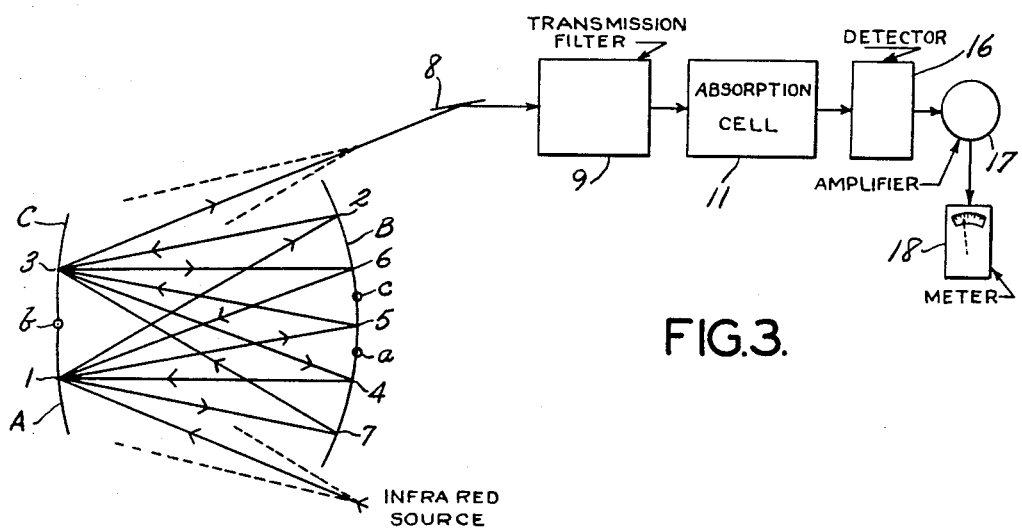

Figs. 3 and 4 schematically show two types of infra-red analyzers incorporating the reflection filter system of the invention.

Like numbers and letters refer to like parts in each figure.

The essential components of the system are three concave selective reflection filters of the same focal length, hereinafter denoted A, B and C for clarity of description, which are set up with two reflection filters, A and C, opposing a third reflection filter, B, and adjusted so that the centers of curvature of reflection filters A and C are located at the surface of reflection filter B opposing them and separated by a distance less than half of the length of reflection filter B and the center of curvature of reflection filter B is between reflection filters A and C. This arrangement establishes a system of conjugate foci on the surfaces of the reflection filters, whereby all the light leaving any point on one reflection filter, for example, A, is brought to a focus by the reflection filter opposing the same, i. e., B, upon the corresponding point on the reflection filter alongside the first, i. e., C, and all of the light leaving the point on the last-mentioned reflection filter C is focused back again by the opposing reflection filter B upon the original reflection filter A. All light leaving any point on the second reflection filter B and going to either the first or the third reflection filter A or C is focused back to a new point on the second reflection filter B that is somewhat offset to one side of the original point. The light continues to be reflected back and forth in the system until it has been shifted so far to one side of reflection filter B that it misses striking it, and thus escapes. In this manner many reflections are obtained from each filter surface while the light is being reflected back and forth in the reflection filter system.

Each time the beam of light of various wave lengths strikes a reflection filter, light of various wave lengths is reflected therefrom according to the particular reflection characteristics of the reflection filter. In consequence, the original beam of light rays from the source of infra-red radiation is progressively purified until there remains substantially only light of the wave lengths selectively reflected by all of the reflection filters in the system. In this way the light beam is converted into a beam that contains light of only a few wave lengths; substantially no light of other than the selected wave length and harmonics thereof is present therein.

It will be understood that the reflection filters of a system may have the same reflection characteristics or that the reflection filters may have different reflection characteristics which in total create the desired wave length reflection pattern. In the latter type of system, light of undesired wave lengths is eliminated by combining reflection filters at least some of which have absorption peaks that coincide with reflection peaks of other reflection filters in the system, while light of desired wave length is retained by combining reflection filters all of which have reflection peaks for light of that wave length.

Referring more particularly to the drawings, the reflection filters of Fig. 1 are adjusted so as to give seven reflections, two each from A and C and three from B; those of Fig. 2 are adjusted so as to give eleven reflections, three each from A and C and five from B.

The systems shown in Figs. 1 and 2 comprise a source of infra-red radiation and three selective spherical reflection filters A, B and C. The reflection filters are so placed that the centers of curvature of filters A and C, denoted $a$ and $c$, respectively, are on the front surface of reflection filter B, while the center of curvature of reflection filter B, denoted $b$, is halfway between filters A and C.

The source of infra-red radiation is not shown in detail in the drawings, for many sources are known to the art. Two common infra-red energy sources are the "Globar," a commercial heater of bonded silicon carbide, manufactured by the Carborundum Company of Buffalo, New York, and the commercial Nernst glower composed of a mixture of rare earth oxides (zirconia, yttria and thoria). These and other infra-red energy sources which may be used are described in an article of Van Zandt Williams, Review of Scientific Instruments 19, No. 3, pages 135 to 178, at 147 and 148 (March 1948).

The path of a beam of light from the source through the system of Fig. 1 is fixed by the positions of the reflection filters and is most easily described in terms of the positions of their centers of curvature. It may be traced through the system by considering each filter as a concave mirror which, in effect, it is, as regards reflected light, and applying the following approximate rule for locating the images formed by concave mirrors. When an object is near the center of curvature of a concave mirror, its image formed by the mirror lies an equal and opposite distance from the center of curvature as the object and on the line from the object through the center of curvature.

In Fig. 1 the central ray of a beam of light from the source passes close to one end of reflection filter B, whence it goes to reflection filter A, striking the same at point 1. The beam is then reflected as follows through the system: It is reflected by A to a point an equal distance on the opposite side of $a$, the center of curvature of A, which point is marked 2, on the surface of filter B. At point 2 all the other rays are also brought to a focus to form an image. From point 2 the central ray is reflected to 3 by filter B, point 3 being located an equal distance on the opposite side of $b$ from point 1. All the other rays from point 1 to filter B are also focused to an image at point 3 by filter B, and rays from other points on filter A are also focused to corresponding image points on filter C, so that filter B forms an image of filter A on filter C. In the same way, the central ray is reflected from filter C to point 4, an equal distance on the opposite side of the center of curvature, $c$, of filter C from point 2. Filter C forms an image of point 2 at this point. In the same way, successively, filter B forms an image of point 3 at point 1, filter A forms an image of point 4 at point 5, filter B forms an image of point 1 at point 3, and finally filter C forms an image of point 5 beyond the end of filter B, where the ray of light can emerge from the system.

In the system of Fig. 2 the central ray of a beam of light from the source passes close to one end of reflection filter B, whence it goes to reflection filter A, striking the same at point 1. The beam is then reflected as follows through the system: It is reflected by A to a point an equal distance on the opposite side of $a$, the center of curvature of A, which point is marked 2 on the surface of filter B. At point 2 all the other rays are also brought to a focus to form an image. From point 2 the central ray is reflected to 3 by filter B, point 3 being located an equal distance on the opposite side of $b$ from point 1. All the other rays from point 1 to filter B are also focused to an image at point 3 by filter B, and rays from other points on filter A are also focused to corresponding image point on filter C, so that filter B forms an image of filter A on filter C. In the same way, the central ray is reflected from filter C to point 4, an equal distance on the opposite side of the center of curvature, $c$, of filter C from point 2. Filter C forms an image of point 2 at this point. In the same way, successively, filter B forms an image of point 3 at point 1, filter A forms an image of point 4 at point 5, filter B forms an image of point 1 at point 3, filter C forms an image of point 5 at point 6, filter B forms an image of point 3 on point 1, filter A forms an image of point 6 at point 7, filter B forms an image of point 1 on point 3, and finally filter C forms an image of point 7 beyond the end of filter B where the ray of light can emerge from the system.

In each of these systems the successive images formed on filters A and C always fall at the same points, and the successive images formed on filter B are off-set to one side of each other. The amount of off-set depends on the separation of the centers of curvature, $a$ and $c$, of filters A and C. This separation of the centers also determines the number of reflections from each filter, which by suitable adjustment of the filters, may be made to give any desired number, $n$, of reflections from filter A, the same number of reflections from filter C, and $2n-1$ reflections from filter B. If filters A and C are adjusted symmetrically opposite filter B and its center of curvature, each image on filter B is separated from the ones nearest to it by the distance between the centers of curvature of reflection filters A and C. Where $n$ is more than one there will be a plurality of reflections from each filter. Thus there is a total of seven reflections for three images on filter B, eleven reflections for five images on filter B, fifteen reflections for seven images on filter B, etc. Intermediate numbers are not possible, because there must be an odd number of images on filter B.

If filters A and C are not symmetrically adjusted horizontally, the images on filter B occur in pairs rather than being uniformly spaced. If filter A or C is slightly out of adjustment in the vertical rather than the horizontal angle, alternate images are raised or lowered above or below the others. In neither case is there serious loss of energy or troublesome cumulative effect of the error. If filter B is out of adjustment, either horizontally or vertically, the first image of filter A formed by filter B does not fall exactly on filter C, and thus some light is lost around the edges. However, after one reflection there is no further loss because that part of the light which did fall on filter C is reflected back and forth between the same image points on filters A and C.

The system provides a large angular aperture off the optic axis, because all of the light reflected from each image on a filter is focused on the next-succeeding filter, so that no light is lost off the edges of the filters. The only way light intensity can be lost is by absorption or scattering of light in or on the reflection filters.

Each time the light beam is reflected from a reflection filter of Figs. 1 and 2, light of a certain wavelength is in part absorbed and in part reflected by the reflection filter in accordance with its particular reflection pattern, and with each successive reflection more of the undesirable wavelengths are eliminated unitl a light beam of substantially the desired wavelengths emerges from the system.

The selective reflection filters employed in the apparatus of the invention may be prepared in many ways, all of which are well known to those skilled in the art.

A type of selective reflection filter which may be prepared for reflection of light of any desired wavelength and which is therefore preferred for use in the apparatus of the invention is the reflection interference filter. This reflection filter is described in papers by L. N. Hadley and D. M. Dennison at J. Opt. Soc. Am. 37, 451–65 (1947), and 38, 483–46 (1948), and makes use of the absorbing properties of a semi-conducting highly reflecting metal film, supported upon a dielectric layer of an inorganic salt, transparent to infra-red radiation in the region in which the filter is to be used, at a distance equal to one quarter of that wavelength in front of a perfectly reflecting mirror called the substrate. Thus the reflection filter may be constructed to selectively reflect light of any desired wavelength by adjusting the thickness of the dielectric layer.

A selective reflection interference filter has a first order reflection peak at a wavelength for which the optical thickness of the dielectric layer is one-half wave and shorter wave length harmonics of that reflection peak at integral fractions of this wave length. In order to isolate a narrow wave length interval at the desired wave length, it is desirable to combine this filter, which is placed in the position of filter A shown in the drawings, with two other filters, one of which has twice the thickness of dielectric as filter A and therefore has a reflection peak at the desired wave length which is twice the order of the reflection peak of filter A and is placed in the position of filter B, and the second of which has four times the thickness of dielectric as filter A and therefore has a reflection peak at the desired wave length that is four times the order of the reflection peak of the first filter and is placed in the position of filter C. The effect of this is to cancel out the reflection maxima characteristic of filters B and C that are not common to filter A by an absorption peak in filter A or B. Thus a narrow wave length interval having a single reflection band, together with shorter wave length harmonics thereof, is obtained. The shorter wave length harmonics are then removed by transmitting the light through a filter which cuts off light of this wave length and transmits the longer wave length.

For example, in order to obtain light having a wave length of 10 microns, it is desirable to employ in the system as the first filter A a reflection interference filter with a fundamental reflection and at 10 microns, as filter B a filter with a fundamental reflection band at 20 microns, and as filter C a filter with a fundamental reflection band at 40 microns. The beam of light emerging from a system of these filters consists substantially of a wave length of 10 microns with harmonic transmission bands at 5 microns, 3.3 microns, 2.5 microns, etc. Light of the shorter wave lengths is then eliminated by passing the beam through a transmission filter which cuts off all light below, say, 8 microns.

The apparatus of Fig. 3 represents one embodiment of a combination of the reflection filter system of the invention with an infra-red analyzer for the straight analysis of an unknown sample and comprises a source of infra-red radiation, a system of selective spherical reflection interference filters A, B and C set to obtain eleven reflections (and therefore similar to the system shown in Fig. 2), a mirror 8, a transmission filter 9 for cutting off shorter wave length harmonics of the reflected wave length, an absorption cell 11, a detector 16, and an amplifier 17 for amplifying the detector signal and transmitting it to a meter 18 which indicates the signal visually for observation and study. The meter is calibrated with known quantities of the substance being analyzed so that it is possible to read from the meter the amount of such substance present in the unknown sample.

Light passed through the system of Fig. 3 is in part reflected and in part absorbed by the filters according to their characteristics, so that the emergent beam consists substantially of light of the desired wave length and shorter wave length harmonics thereof. Next the beam is directed by the mirror 2 into and passes through the transmission filter 9 wherein the shorter wave length harmonics are absorbed, while light of the desired wave length is transmitted for passage through the absorption cell 11 containing the sample to be analyzed. The amount of light is diminished by the amount absorbed by the sample, which is a function of the amount of substance present capable of absorbing at this wave length. The diminished beam then strikes the detector, is transformed into a signal which is amplified by the amplifier, and is then indicated visually for the observer by the meter 18.

There is no requirement as to the sequence of the components aligned in the optical system of Fig. 3 other than that the light passes from the source through each to the detector. For example, the transmission filter or the absorption cell may be made to follow the source if more convenient.

The apparatus of Fig. 4 represents another embodiment of a combination of the reflection filter system of the invention with a more complex differential infra-red analyzer employing a compensating cell. The apparatus comprises a source of infra-red radiation; a system of selective spherical reflection interference filters A, B and C, set to obtain seven reflections (and therefore similar to the system shown in Fig. 1), a transmission filter 9, for further purifying the radiation, a beam splitter 10 for dividing the emergent beam into two portions, a pair of mirrors 8 and 8', an absorption cell 11 and a compensating absorption cell 12, a differential detector 16 and an amplifier-recorder system 15.

Light passed through the system is concentrated into selected wave length intervals according to the reflection characteristics of the filters A, B and C. The diminished beam passes through the transmission filter 9 where harmonics of wave lengths other than the desired wave lengths are absorbed, and then strikes the beam splitter 10, where it is divided into two beams. The respective beams are directed by mirrors 8 and 8' into and pass through the absorption and compensating cells, 11 and 12, respectively. A known standard is placed in cell 11, and the unknown sample in cell 12. The amount of light of the selected wave length absorbent in each cell depends upon the amount of substance present. The beams transmitted by the cells then strike the detector system, which measures the difference in the amount of energy in the two beams and indicates it for the observer, who thereby determines the amount of substance present in the unknown sample. This instrument is also calibrated with known quantities of the substance to be determined.

There is no requirement as to the sequence of the components aligned in the optical system of Fig. 4 other than that the light passes from the source through each to the detector, and that only part of the light passes through each cell. For example, two beams of light may be taken separately from the source and one passed through each cell. The two are then combined to give a single beam which subsequently passes through the filters to the differential detector system.

The detector of Figs. 3 and 4 is not shown in detail, for it may be any one of many conventional types, all of which are well known in the art. It may be sensitive to infra-red radiation either of certain wave lengths (selective detector) or of a wide range of wave lengths (non-selective detector). The amplifier and meter or recorder likewise may be of conventional type. Various types of detectors, amplifiers, meters and recorders which may be used in the analyzer of the invention are described in the Van Zandt Williams article referred to above, at pages 155 to 162 thereof. The source may also be selective, either by virtue of its emissive properties, such as a flame, or by virtue of its operating temperature, which changes its spectral energy distribution.

The presence of substances other than the substance for which the analysis is being run in the sample will not affect the results, provided such impurities do not have any absorption bands at the wave lengths being used for the analysis. If such impurities do have interfering absorption bands in common with the substance being determined, their effects may be compensated in the system shown in Fig. 4 by the use of suitable materials in the compensating and filter cells. This technique is familiar to those skilled in the art and may be found described in the following references:

G. Kivison, J. Opt. Soc. Am. 40, 112 (1950).

R. C. Fowler, Rev. Sci. Inst. 20, 175 (1949).

W. G. Fastie and A. H. Pfund, J. Opt. Soc. Am. 37, 762 (1947).

N. Wright and L. W. Herscher, J. Opt. Soc. Am. 36, 195 (1946).

The apparatus of Figs. 3 and 4 may be used for the analysis of liquids, gases or solids, but the substances must be transparent to infra-red radiation, so that light may be transmitted and received upon the detector system. Thus, for example, if a solid is to be analyzed, it may be dissolved in a solvent which is transparent to the radiation employed.

If desired, filter 9 may be eliminated if no harmonics are present or if they are eliminated by the use of suitable selective sources or detectors or other means.

Another type of infra-red gas analyzer in which the selective reflection filter system in accordance with the invention may be substituted for the filters therein set forth is shown by K. F. Luft, Zeits, F. Tech. Physik 5, 97 (1943). Other instruments have been described in the literature for use in the infra-red region which achieve wave length isolation by various means. The wave length isolation system of selective reflection filters in accordance with the invention may be employed in these instruments.

The selective reflection filter system in accordance with the invention has many uses in addition to the identification and quantitative analysis of a variety of substances, as herein set forth. For example, it may be used to provide radiation in a pure isolated wave length interval for selective signaling devices or for the irradiation of samples, or for other purposes. Since many other changes and modifications will be apparent to those skilled in the art, it is to be understood that the invention is to be limited only by the scope of the appended claims.

I claim:

1. An infra-red filter system for separating radiation in a selected wave length interval from radiation of wave lengths lying to either side of said interval in such manner that said last-named radiation is reduced to negligible value relative to the radiation in said interval, comprising first, second and third selective reflection interference filters each in the form of a spherical surface and each of the same focal length, each of said filters being characterized in structure by a dielectric layer sandwiched between a substrate reflector and a surface reflector in the form of a thin metallic film, the first filter layer having a thickness which optically is half the wavelength of radiation in the selected interval, the second and third filter layers having respective thicknesses which are twice and four times that of the first filter layer, said first, second and third filters thereby respectively having first order, second order and fourth order reflection peaks at the wavelength of radiation in the selected interval, said first and second filters thereby providing absorption peaks which cancel with the first order reflection peak of said second filter and with the first and second order reflection peaks of said third filter, the filters being arranged facing each other so that one reflection filter is opposite the other two and the center of curvature of the first-mentioned reflection filter is between the two opposing reflection filters and the centers of curvature of the two opposing reflection filters are located at the surface of the first and separated by a distance less than half of the length of the first reflection filter whereby the optical path through the system includes a plurality of reflections from each filter surface.

2. An infra-red filter system for separating radiation in a selected wave length interval from radiation of wave lengths lying to either side of said interval in such manner that said last-named radiation is reduced to negligible value relative to the radiation in said interval, comprising first, second and third selective reflection interference filters each in the form of a spherical surface and each of the same focal length, each of said filters being characterized in structure by a dielectric layer sandwiched between a substrate reflector and a surface reflector in the form of a thin metallic film, the first filter layer having a thickness which optically is half the wavelength of radiation in the selected interval, the second and third filter layers having respective thicknesses which are twice and four times that of the first filter layer, said first, second and third filters thereby respectively having first order, second order and fourth order reflection peaks at the wavelength of radiation in the selected interval, said first and second filters thereby providing absorption peaks which cancel with the first order reflection peak of said second filter and the first and second order reflection peaks of said third filter, the filters being arranged facing each other so that one reflection filter is opposite the other two and the center of curvature of the first-mentioned reflection filter is between the two opposing reflection filters and the centers of curvature of the two opposing reflection filters are located at the surface of the first, whereby there exists a system of conjugate foci on the reflecting surfaces of the reflection filters such that the number of reflections of light from the first mentioned filter is given by the formula $2n-1$ and the number of reflections of light from each of the other filters is $n$, where $n$ is a whole number of at least 2, and a transmission filter disposed in the optical path of light emerging from said reflection filter system, said transmission filter having a cut-off characteristic which eliminates radiation occuring in wavelength bands which are shorter wavelength harmonics of the radiation in said selected interval.

References Cited in the file of this patent

UNITED STATES PATENTS

| | | |
|---|---|---|
| 1,975,001 | Brown | Sept. 25, 1934 |
| 2,032,588 | Miller, Jr. | Mar. 3, 1936 |
| 2,218,270 | Snook | Oct. 15, 1940 |
| 2,269,674 | Liddel et al. | Jan. 13, 1942 |
| 2,327,539 | McAlister | Aug. 24, 1943 |

OTHER REFERENCES

White: "Long optical paths of large aperture," article in Journal of the Optical Society of America, vol. 32, pages 285–288, May 1942, published by American Institute of Physics, New York City.

Infra-Red Instrumentation and Technique, by Van Zandt Williams, Review of Scientific Instruments, March 1948, pages 176–177.

Hadley et al.: "Reflection and transmission interference filters," article in Journal of the Optical Society of America, vol. 38, pages 483–496 (especially Fig. 1 on page 485, June 1948).

E. E. Barr: "An experimental study of Dennison-Hadley infra-red reflection filters," article in Journal of the Optical Society of America, page 634, vol. 39, No. 7, July 1949, published in New York, N. Y.

UNITED STATES PATENT OFFICE
CERTIFICATE OF CORRECTION

Patent No. 2,729,143 January 3, 1956

John U. White

It is hereby certified that error appears in the printed specification of the above numbered patent requiring correction and that the said Letters Patent should read as corrected below.

Column 1, line 52, for "asborption" read -- absorption --; column 3, line 75, for "of" read -- by --; column 4, line 1, for "Instruments19" read -- Instruments 19 --; column 5, line 39, for "unitl" read --until--; column 6, line 14, for "and" read -- band --; column 7, line 11, for "absorbent" read -- absorbed --.

Signed and sealed this 21st day of February 1956.

(SEAL)
Attest:

E. J. MURRY
Attesting Officer

ROBERT C. WATSON
Commissioner of Patents